United States Patent
Czaplewski et al.

(10) Patent No.: US 9,892,286 B2
(45) Date of Patent: *Feb. 13, 2018

(54) SHAPE ACTUATION ENCAPSULANT OF A CRYPTOGRAPHIC MODULE

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/060,839

(22) Filed: Mar. 4, 2016

(65) Prior Publication Data
US 2017/0140176 A1    May 18, 2017

Related U.S. Application Data

(63) Continuation of application No. 14/942,433, filed on Nov. 16, 2015, now Pat. No. 9,565,021.

(51) Int. Cl.
*H04L 9/00*    (2006.01)
*G06F 21/87*    (2013.01)
*H04L 9/10*    (2006.01)

(52) U.S. Cl.
CPC .......... *G06F 21/87* (2013.01); *H04L 9/10* (2013.01); *H04L 2209/12* (2013.01)

(58) Field of Classification Search
CPC ........ G06F 21/87; G06F 21/60; G06F 21/602; G06F 21/00; H01L 23/573; H01L 2924/0002; H01L 2924/00; H04L 9/00
See application file for complete search history.

(56) References Cited

U.S. PATENT DOCUMENTS

| 5,880,523 A | 3/1999 | Candelore |
| 6,758,404 B2 | 7/2004 | Ladyansky |

(Continued)

FOREIGN PATENT DOCUMENTS

WO    WO2011046769    4/2011

OTHER PUBLICATIONS

Rahaman, et al., "Side Channel Attack Prevention for AES Smart Card," Proceedings of 11 th International Conference on Computer and Information Technology (ICCIT 2008), Dec. 2008.

(Continued)

*Primary Examiner* — Brandon Hoffman
*Assistant Examiner* — Helai Salehi
(74) *Attorney, Agent, or Firm* — Matthew C. Zehrer

(57) ABSTRACT

To provide for a physical security mechanism that forms a complete envelope of protection around the cryptographic module to detect and respond to an unauthorized attempt at physical access, a tamper sensing encapsulant generally encapsulates the cryptographic module. The tamper sensing encapsulant includes a first shape actuation layer associated with an electrically conductive first trace element and a second shape actuation layer associated with an electrically conductive second trace element. The first shape actuation layer is positioned against the second shape actuation layer such that the first trace element and the second trace element do not physically touch at an operating temperature of the cryptographic module and do physically touch when the first shape actuation layer and the second shape actuation layer are thermally loaded. Upon first trace element and the second trace element touching, a circuit is formed that disables the cryptographic module.

17 Claims, 6 Drawing Sheets

(56) References Cited

U.S. PATENT DOCUMENTS

| | | |
|---|---|---|
| 6,853,093 B2 | 2/2005 | Choen et al. |
| 7,005,733 B2 | 2/2006 | Kommerling et al. |
| 7,065,656 B2 | 6/2006 | Schwenck et al. |
| 7,495,554 B2 | 2/2009 | Heffner |
| 8,918,893 B2 | 12/2014 | Hadley |
| 2005/0275538 A1* | 12/2005 | Kulpa ............... G06F 21/87 340/568.2 |
| 2009/0122984 A1* | 5/2009 | Fascenda ............ H04K 1/00 380/247 |
| 2011/0031982 A1 | 2/2011 | Leon et al. |
| 2013/0188326 A1 | 7/2013 | Shi et al. |
| 2014/0108786 A1* | 4/2014 | Kreft ................. G06F 21/71 713/156 |

OTHER PUBLICATIONS

Meng, et al., "Shape Actuation via Internal Stress-Induced Crystallization of Dual-Cure Networks," Jan. 10, 2015.
"List of IBM Patents or Patent Applications Treated as Related," Mar. 3, 2016.

\* cited by examiner

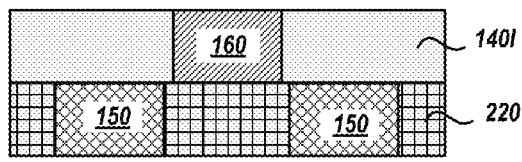 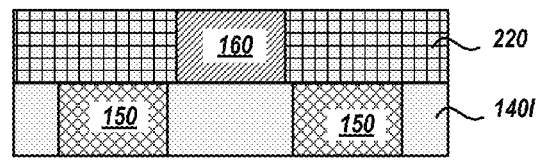
FIG. 9A  FIG. 9B
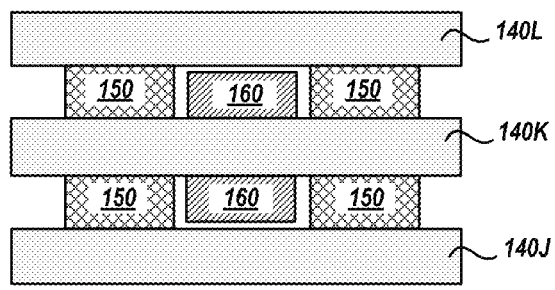
FIG. 10
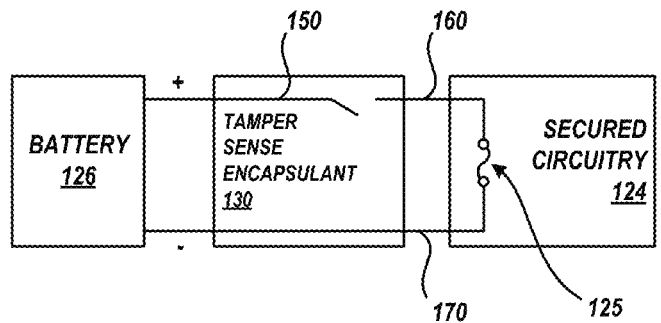
FIG. 11

SHAPE ACTUATION ENCAPSULANT OF A CRYPTOGRAPHIC MODULE

FIELD OF THE INVENTION

Embodiments of the invention generally relate to computer systems and more particularly to encapsulating a cryptographic module in a shape actuation encapsulant.

DESCRIPTION OF THE RELATED ART

A cryptograph module is the set of hardware, software, firmware, or some combination thereof that implements cryptographic logic or cryptographic processes, including cryptographic algorithms, and is contained within the cryptographic boundary of the module. U.S. Government Federal Information Processing Standard (FIPS) 140-2 Security Requirements for Cryptographic Modules-(Level 4) is a standard that specifies security requirements for cryptographic modules. This standard requires that physical security mechanisms provide a complete envelope of protection around the cryptographic module with the intent of detecting and responding to all unauthorized attempts at physical access.

A non exhaustive list of a cryptographic modules is as follows: cryptographic coprocessor, cryptographic accelerator, cryptographic daughter card, cryptographic field programmable gate array (FPGA), memory storing cryptographic accelerator data, etc.

In a particular example of a cryptographic module, a cryptographic coprocessor is a secure cryptoprocessor that performs cryptographic operations used by application programs and by data handling operations, such as SSL (Secure Sockets Layer) private key transactions associated with SSL digital certificates. The cryptoprocessor includes a tamper-responding hardware security module that provides secure storage for storing crypto keys and other sensitive data. Cryptoprocessor applications may include financial PIN (Personal Identification Number) transactions, bank-to-clearing-house transactions, EMV (Europay®, Master-Card®, and Visa®) transactions for integrated circuit (chip) based credit cards, basic SET (Secure Electronic Transaction) block processing, and general-purpose cryptographic applications using symmetric key, hashing, and public key algorithms. The crypto keys may be generated in the cryptoprocessor and may be saved in a keystore file encrypted under a master key of that cryptoprocessor.

SUMMARY

In an embodiment of the present invention, a method of fabricating a tamper sensing encapsulant includes forming an electrically conductive first trace element associated with a first shape actuation layer, forming an electrically conductive second trace element associated with a second shape actuation layer, and positioning the first shape actuation layer against the second shape actuation layer such that the first trace element and the second trace element do not physically touch at a predetermined operational temperature and do physically touch when the first shape actuation layer and the second shape actuation layer are thermally loaded.

In another embodiment of the present invention, a method of detecting and responding to an unauthorized attempt of physical access of a secure crypto module includes physically contacting a first trace element with a second trace element to form a circuit, as a result of thermal loading of a secure crypto module These and other embodiments, features, aspects, and advantages will become better understood with reference to the following description, appended claims, and accompanying drawings.

BRIEF DESCRIPTION OF THE DRAWINGS

FIG. 9A and FIG. 9B illustrate a shape actuation encapsulant layer associated with at least one trace element and a stationary encapsulant layer associated with at least one trace element, according to various embodiments of the present invention.

FIG. 10 illustrates multiple encapsulant layers associated with at least one trace element, according to various embodiments of the present invention.

FIG. 11 illustrates a block circuit diagram of a secure crypto module, according to various embodiments of the present invention.

DETAILED DESCRIPTION

Embodiments are related to providing a physical security mechanism that forms a complete envelope of protection around a cryptographic module to detect and respond to an unauthorized attempt at physical access thereof. A tamper sensing encapsulant generally encapsulates the cryptographic module. The tamper sensing encapsulant includes a first shape actuation layer associated with an electrically conductive first trace element and a second shape actuation layer associated with an electrically conductive second trace element. The first shape actuation layer is positioned against the second shape actuation layer such that the first trace element and the second trace element do not physically touch at an operating temperature of the cryptographic module and do physically touch when the first shape actuation layer and the second shape actuation layer are thermally loaded. Upon first trace element and the second trace element touching, a circuit is formed that disables the cryptographic module.

Figure 1:
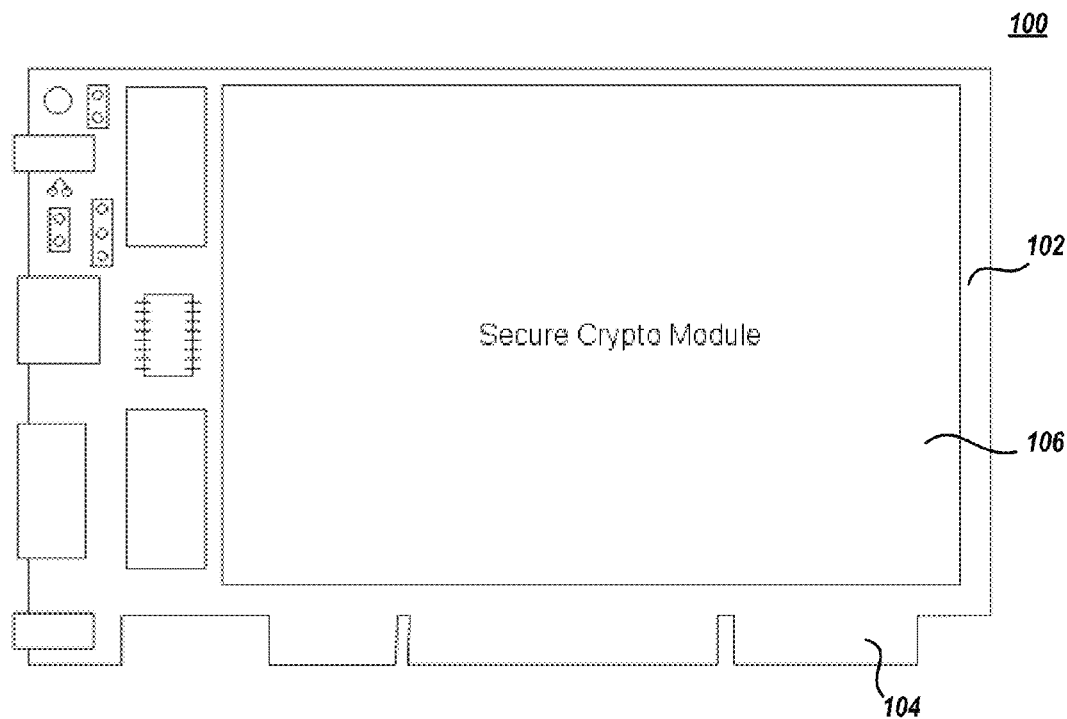
FIG. 1 illustrates an exemplary crypto card including a secure crypto module that may utilize various embodiments of the present invention.

Referring to the Drawings, wherein like numbers denote like parts throughout the several views, FIG. 1 illustrates a crypto card 100 that includes a secure crypto module 106. Crypto card 100 includes a printed circuit board 102 and connector 104 that can be inserted into an electrical connector, or expansion slot on a computer motherboard, backplane or riser to add functionality to the computer via an expansion bus. Printed circuit board 102 provides mechanical support for various electronic components as well as conductive pathways to provide for electrical communication (e.g., data transfer, etc.) there between and to and from the motherboard. The computer motherboard, backplane or riser, hereinafter referred to as a motherboard, provides mechanical support for computer components such as a processor and memory and provides conductive pathways to provide for electrical communication to and from the computer components. The expansion bus, a particular conductive pathway, is a computer bus which moves information between the internal hardware of the computer (e.g., the processor and memory) and peripheral devices.

Secure crypto module 106 provides a complete envelope of protection around a cryptographic module 110 (not shown in FIG. 1) to detect and respond to unauthorized attempts at physical access or tampering therewith.

Figure 2:
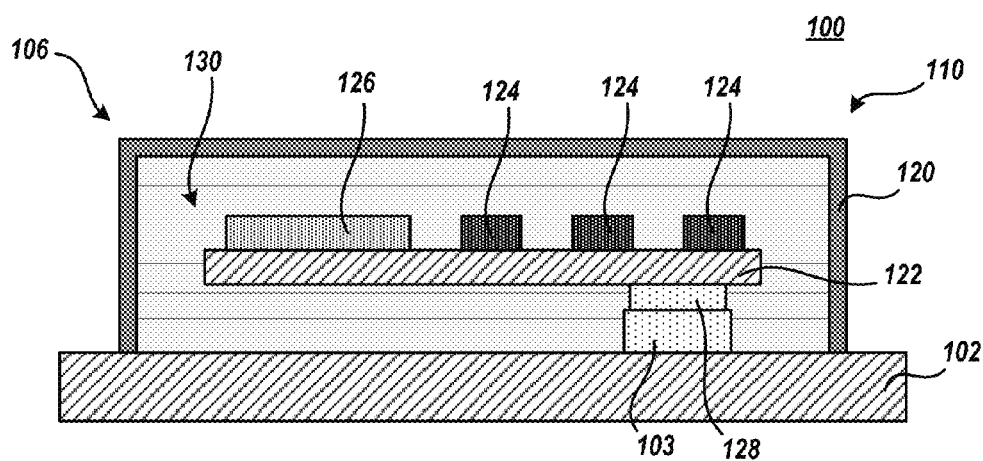
FIG. 2 illustrates a cross section of an exemplary crypto card that includes a cryptographic module surrounded by various encapsulant layers, according to various embodiments of the present invention.

FIG. 2 illustrates a cross section of crypto card 100. Secure crypto module 106 may include cryptographic module 110, shield 120, and tamper sensing encapsulant 130 generally surrounding cryptographic module 110. Cryptographic module 110 is a collective set of hardware, software, firmware, or some combination thereof that implements cryptographic logic or cryptographic processes, including cryptographic algorithms, and is contained within the boundary or shield 120 of the secure crypto module 106.

Cryptographic module 110 may include a daughter card 122, battery 126, crypto components 124, and connector 128. Daughter card 122 provides mechanical support for battery 126 and secure crypto components 124 and includes conductive pathways to provide for electrical communication between secure crypto components 124 and or between secure crypto components 124 and printed circuit board 102 via connector 128 and printed circuit board 102 connector 103. The various connectors and conductive pathways contemplated herein generally allow for secure crypto components 124 to electrically communicate with one or more computer components of the motherboard. Battery 126 provides electric potential to a circuit formed by trace elements touching within tamper sensing encapsulant 130. The battery 126 may further provide backup power to one or more features of the cryptographic module 110 and may be active from the time of factory initialization until the end of the cryptographic module 110 expected product life. Crypto components 124 are hardware computer components that implement cryptographic logic or cryptographic processes or otherwise store cryptographic data. Exemplary crypto components 124 may be a coprocessor, memory (DRAM, Flash, ROM, RAM, etc.), FPGA, etc.

Shield 120 is an enclosure, chassis, envelope, or other shell that generally surrounds and protects the internal cryptographic module 110. Shield 120 may be void of access or air flow cutouts to limit access the internal cryptographic module 110. In some implementations where a crypto component 124 may be cooled, a heat sink may be thermally attached to the crypto component 124 and the fins or pins of the heat sink may protrude through the shield 120. In an embodiment, shield 120 may surround the cryptographic module 110 on at least five sides, the sixth side of cryptographic module 110 being protected by the printed circuit board 102. In another embodiment, shield 120 may surround the cryptographic module 110 on all six sides of the cryptographic module 110. In embodiments, the shield 120 may be formed from sheet metal. By surrounding the internal cryptographic module 110, shield 120 generally protects the cryptographic module 110 by limiting physical penetration thereto. Shield 120 may also incorporate a detection wire mesh such that upon damage to the wire mesh, an immediate zeroization of area(s) of the one or more crypto components 124 where sensitive data is stored and the one or more crypto components 124 are permanently disabled, such that the one or more crypto components 124 are rendered inoperable.

Tamper sensing encapsulant 130 generally surrounds cryptographic module 110 between shield 120 and cryptographic module 110. Tamper sensing encapsulant 130 acts as a temperature sensor to detect and respond to unauthorized attempts at physical access to the encapsulated cryptographic module 110. Tamper sensing encapsulant 130 includes multiple encapsulant layers with each encapsulant layer being associated with at least one trace element. For clarity, the term "associated" when used with reference to a trace element and an encapsulant layer means that the trace element may be formed directly upon the encapsulant layer, formed within the encapsulant layer, formed partially within encapsulant layer, etc.

In embodiments, two types of trace elements are present within tamper sensing encapsulant 130. One type of trace element is electrically connected to battery 126. Another type of trace element is electrically connected to one or more destruct features within respective crypto components 124. A trace element, generally, is a length of electrically conductive material, such as copper, aluminum, etc.

In a normal operating state, the encapsulant layers and trace elements are arranged so that distinct trace elements types are not in physical contact. In a thermally loaded state, at least one of the encapsulant layers expands or contracts moving the associated trace element to be in physical contact with a distinct type trace element. The thermally loaded state may be caused by artificial heating (i.e., heating not associated with normal operation of the cryptographic module 110, etc.) or artificial cooling (i.e., cooling not associated with normal operation of the cryptographic module 110, etc.) of the secure crypto module 106. Upon touching, the distinct trace elements form a short circuit between battery 126 and the destruct features, whereby the enablement of the destruct features causes an immediate zeroization of area(s) of the one or more crypto components 124 where sensitive data is stored and permanent disablement of the one or more crypto components 124.

Figure 3:
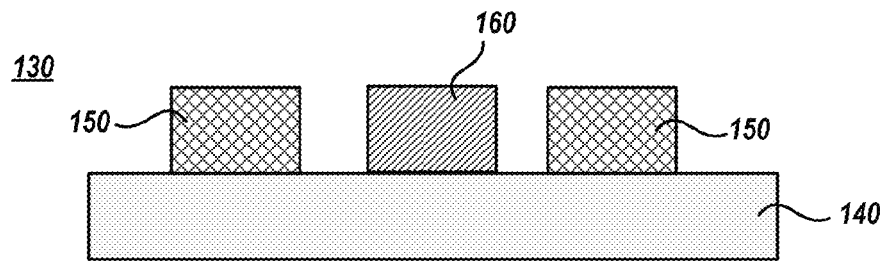
FIG. 3 illustrates a shape actuation encapsulant layer associated with various circuit trace elements, according to various embodiments of the present invention.

FIG. 3 illustrates a shape actuation encapsulant layer 140 of the tamper sensing encapsulant 130 that is associated with a battery connected (BC) trace element 150 and a crypto component connected (CC) trace element 160 in a normal operating state. BC trace element 150 is electrically connected to battery 126. CC trace element 160 is electrically connected to one or more destruct features within respective crypto components 124. The one or more destruct features within respective crypto components 124 are also electrically connected to the battery 126. Therefore, upon BC trace element 150 and CC trace element 160 touching, a circuit is formed whereby current passes across the one or more destruct features thereby enabling the one or more destruct features.

In an embodiment, a plurality of CC trace elements 160 may be electrically interconnected via a switch pad, or equivalent, that electrically connects to daughter card 122, whereby a particular conductive pathway of the daughter card may electrically connect the switch pad and one or more crypto components 124. Likewise, a plurality of BC trace elements 150 may be electrically interconnected via a switch pad, or equivalent that electrically connects to daughter card 122, whereby particular conductive pathway of the daughter card may electrically connect the switch pad and battery 126.

In the embodiment depicted in FIG. 3, BC trace element 150 and CC trace element 160 are formed upon shape actuation encapsulant layer 140. Such formation techniques are generally known in the art. For instance BC trace element 150 and CC trace element 160 may be formed by a masking processes whereby a mask, such as a photoresist, is applied to shape actuation encapsulant layer 140 and patterned to form trenches within which the BC trace element 150 and CC trace element 160 may be formed by deposition, plating, etc. Though shown as having a rectangular cross section, BC trace element 150 and CC trace element 160 may have a triangular cross section, a "T" shape cross section, etc. BC trace element 150 and CC trace element 160 may each further include extension portions extending from the exposed surfaces of the BC trace element 150 and CC trace element 160.

As the tamper sensing encapsulant 130 is depicted in a normal operating state, BC trace element 150 and CC trace element 160 are arranged so that BC trace element 150 and CC trace element 160 are not in physical contact.

Shape actuation encapsulant layer 140 is a single-phase, two-way shape actuator layer that, in the absence of an external load, elongates upon cooling and contracts upon heating. Shape actuation encapsulant layer 140 may be formed by a fabrication process where a partially cross-linked, semicrystalline poly(ε-caprolactone) (PCL) network is melted, stretched to several hundred percent strain, and further cross-linked. Upon removal of the applied load, the elastic double network adopts a "state-of-ease" that retains part of its former strain. When cooled, internal stress-induced crystallization of shape actuation encapsulant layer 140 causes further elongation of configurationally biased chains. When heated, crystallites melt, and shape actuation encapsulant layer 140 contracts.

Figure 4:
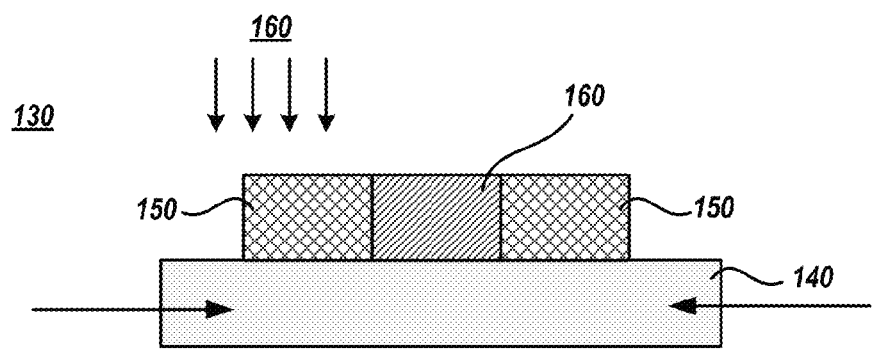
FIG. 4 illustrates a shape actuation encapsulant layer associated with various circuit trace elements in a thermal loading state, according to various embodiments of the present invention.

FIG. 4 illustrates a shape actuation encapsulant layer 140 of the tamper sensing encapsulant 130 associated with BC trace element 150 and CC trace element 160 in a thermal heating state 160. The thermally heated state 160 may be caused by artificial heating of crypto card 100, etc. (i.e., heating not associated with normal operation of the cryptographic module 110, etc.). For example, crypto card 100 may be placed in a solder reflow oven by an unauthorized party in an attempt to remove components thereon, etc. The heat from the oven transfers to tamper sensing encapsulant 130 and to shape actuation encapsulant layer 140 which causes the contraction thereof and relative movement between BC trace element 150 and CC trace element 160.

In the thermally heated state 160, shape actuation encapsulant layer 140 contracts moving BC trace element 150 and CC trace element 160 to be in physical contact. For example, an extension portion extending from a side surface of BC trace element 150 may touch an extension portion extending from a facing side surface of CC trace element 160.

Upon touching, BC trace element 150 and CC trace element 160 form a short circuit between battery 126 and the destruct feature within one or more crypto components 124, thereby enabling the destruct feature. The enablement of the destruct feature causes an immediate zeroization of area(s) of the one or more crypto components 124 where sensitive data is stored and the permanent disablement of the one or more crypto components 124.

Figure 5:
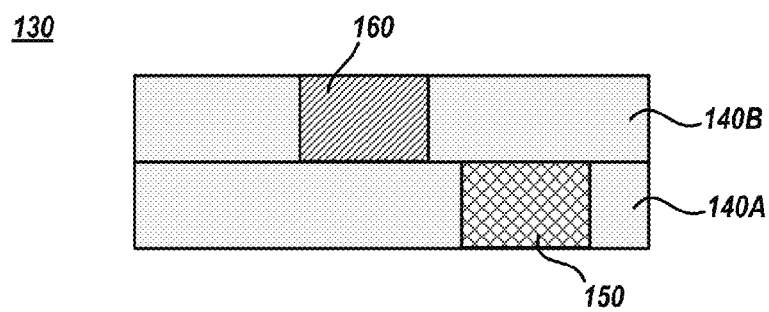
FIG. 5 illustrates various shape actuation encapsulant layers associated with various circuit trace elements, according to various embodiments of the present invention.

FIG. 5 illustrates a first shape actuation encapsulant layer 140A of the tamper sensing encapsulant 130 associated with BC trace element 150 and a second shape actuation encapsulant layer 140B of the tamper sensing encapsulant 130 associated with CC trace element 160 upon the layer 140A in a normal operating state. In the embodiment depicted in FIG. 5, BC trace element 150 is formed within first shape actuation encapsulant layer 140A and CC trace element 160 is formed within second shape actuation encapsulant layer 140B. Such formation techniques are generally known in the art. For instance BC trace element 150 and CC trace element 160 may be formed by a masking processes whereby a mask, such as a photoresist, is applied to the appropriate shape actuation encapsulant layer 140 and patterned to form trenches within which the BC trace element 150 and or CC trace element 160 may be formed by deposition, plating, etc. As the tamper sensing encapsulant 130 is depicted in a normal operating state, BC trace element 150 and CC trace element 160 so that BC trace element 150 and CC trace element 160 are not in physical contact.

Figure 6:
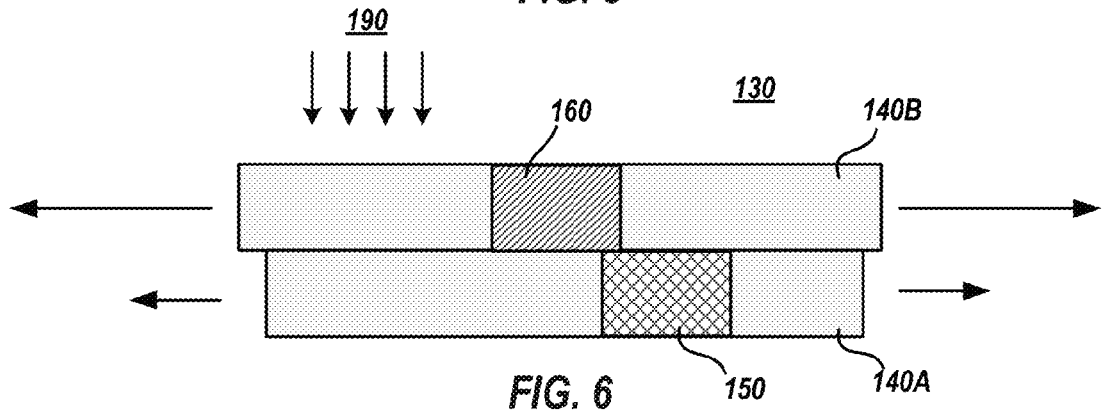
FIG. 6 illustrates various shape actuation encapsulant layers associated with various circuit trace elements in a thermal loading state, according to various embodiments of the present invention.

FIG. 6 illustrates first shape actuation encapsulant layer 140A of the tamper sensing encapsulant 130 associated with BC trace element 150 and second shape actuation encapsulant layer 140B of the tamper sensing encapsulant 130 associated with CC trace element 160 upon the layer 140A in a thermal cooling state 190.

The thermally cooling state 190 may be caused by artificial cooling of crypto card 100, etc. (i.e., cooling not associated with normal operation of the cryptographic module 110, etc.). For example, crypto card 100 may be placed in a freezer by an unauthorized party in an attempt make various materials with crypto card 100 brittle to ease the removal of components thereon, etc. Heat from the encapsulant 130 transfers to the artificially cool environment outside of the secure crypto module 106 which causes the expansion of first shape actuation encapsulant layer 140A and second shape actuation encapsulant layer 140B and relative movement between BC trace element 150 and CC trace element 160.

In the thermally cooling state 190, due to heat transfer thermal gradients, the shape actuation encapsulant layer 140 nearest the cool environment cools more quickly and therefore elongates at a faster rate than a shape actuation encapsulant layer 140 at a greater distance away from the cool environment. For example, first shape actuation encapsulant layer 140A may elongate more quickly relative to second shape actuation encapsulant layer 140B. The relative movement between BC trace element 150 and CC trace element 160 results in BC trace element 150 and CC trace element 160 to be in physical contact. Upon this contact, the destruct feature within one or more crypto components 124 is enabled and area(s) of the one or more crypto components 124 where sensitive data is stored are zeroed and the one or more crypto components 124 are permanent disabled.

Figure 7:
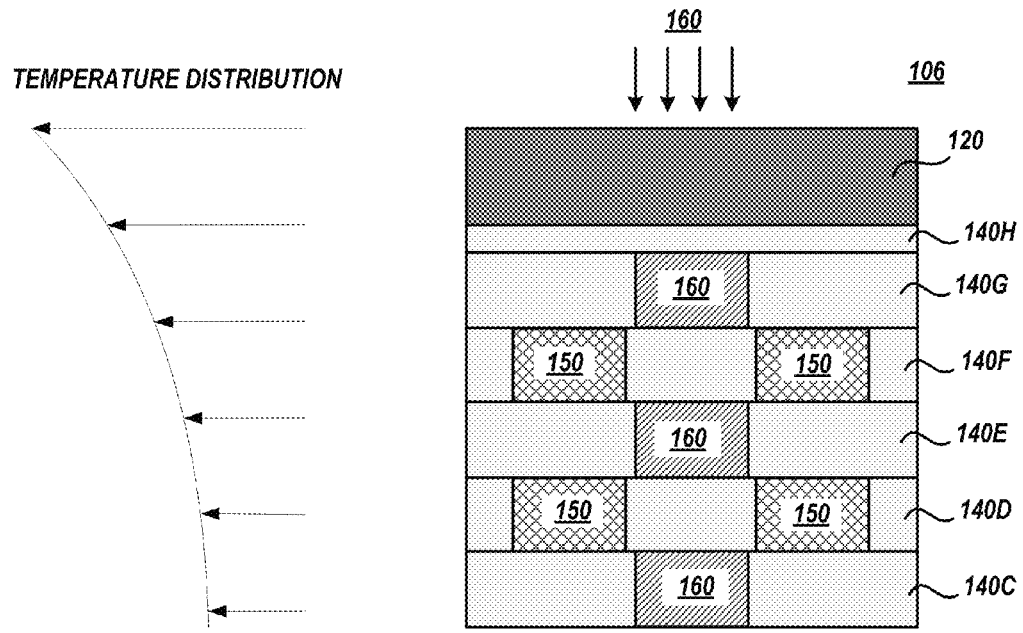
FIG. 7 and FIG. 8 illustrate cross section views of a portion of a secure crypto module and thermal gradients therethrough during respective thermal loading states, according to various embodiments of the present invention.

FIG. 7 illustrates a cross section view of a portion of secure crypto module 106 and a thermal gradient there through during a thermal heating state 160. When artificially heated, thermal energy from the environment transfers into secure crypto module 106. Thus the encapsulant layers or portions of encapsulant layers nearest the perimeter of secure crypto module 106 are heated more quickly relative to encapsulant layers or portions of encapsulant layers furthest away from the perimeter of secure crypto module 106. For example, shape actuation encapsulant layer 140G is heated more quickly relative to shape actuation encapsulant layers 140F-140C and therefore elongates at a faster rate than the other shape actuation encapsulant layers.

Also shown in FIG. 7, in embodiments, multiple BC trace elements 150 and CC trace elements 160 are arranged in a trace element array within tamper sensing encapsulant 130, such that a particular trace element is nearest to opposite type trace elements. For example, CC trace elements 160 in shape actuation encapsulant layer 140E is nearest to BC trace elements 150 in shape actuation encapsulant layer 140E in an upper right and upper left position, respectively, and is nearest to BC trace elements 150 in shape actuation encapsulant layer 140D in an lower right and lower left position.

Figure 8:
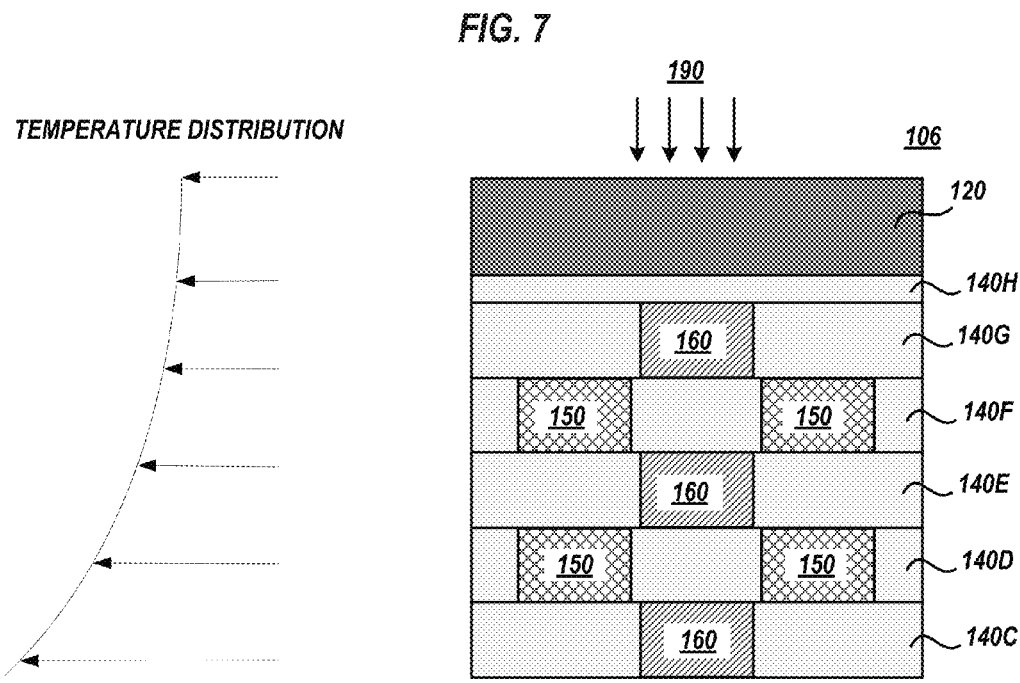

FIG. 8 illustrates a cross section view of a portion of secure crypto module 106 and a thermal gradient there through during a thermal cooling state 190. When artificially cooled, thermal energy from tamper sensing encapsulant 130 transfers into the cool environment surrounding secure crypto module 106. Thus, the encapsulant layers or portions of encapsulant layers nearest the perimeter of secure crypto module 106 are cooled more quickly relative to encapsulant layers or portions of encapsulant layers furthest away from the perimeter of secure crypto module 106. For example, shape actuation encapsulant layer 140G is cooled more quickly relative to shape actuation encapsulant layers 140F-140C and therefore contracts at a faster rate than the other shape actuation encapsulant layers.

FIG. 9A and FIG. 9B illustrate shape actuation encapsulant layer 140I associated with at least one trace element upon a stationary encapsulant layer 220 associated with at least one trace element. Stationary layer 220 is a layer that does not elongate and/or contract in response to a thermal load relative to shape actuation encapsulant layer 140I. Stationary layer 220 may be a polymer layer, etc. As shown in FIG. 9A, a BC trace element 150 may be associated with stationary layer 220 and CC trace element 160 may be associated with shape actuation encapsulant layer 140I. As shown in FIG. 9B, a CC trace element 160 may be associated with stationary layer 220 and BC trace element 150 may be associated with shape actuation encapsulant layer 140I.

Also contemplated is the utilization of shape actuation encapsulant layers that singularly respond to thermal loading. For example, tamper sensing encapsulant 130 may include a first single response shape actuation encapsulant layer associated with a trace element that elongates during thermal heating but does not contract during thermal cooling and a second single response shape actuation encapsulant layer associated with a trace element that does not elongate during thermal heating but contracts during thermal cooling. Thus, in a thermal heating state, the first single response shape actuation encapsulant layer moves relative to the second single response shape actuation encapsulant layer, thereby enabling the touching of the associated trace elements. Likewise, in a thermal cooling state, the second single response shape actuation encapsulant layer moves relative to the first single response shape actuation encapsulant layer, thereby enabling the touching of the associated trace elements.

FIG. 10 illustrates multiple shape actuation encapsulant layers 140J-140L associated with at least one trace element in a normal operating state. In the embodiment shown in FIG. 10, BC trace elements 150 are formed upon shape actuation encapsulant layer 140J and upon shape actuation encapsulant layers 140L. An opening, gap, space, or void exists between these BC trace elements 150. CC trace elements 160 are formed upon shape actuation encapsulant layer 140K. The multiple shape actuation encapsulant layers 140J-140L are arranged such that CC trace elements 160 are positioned within the opening between BC trace elements 150. For clarity, in this present paragraph, BC trace element 150 may take the place of CC trace element 160, and visa versa.

FIG. 11 illustrates a block circuit diagram of various components of secure crypto module 106. In a normal operating, state an open circuit exists between the battery 126, tamper sensing encapsulant 130, and one or more crypto components 124. More specifically, the BC trace element 150 is electrically connected to battery 126 and CC trace element 160 is electrically connected to one or more destruct features 125 within respective crypto components 124. The one or more destruct features 125 within respective crypto components 124 are also electrically connected to the battery 126 via connection 170. As a result of thermal loading causing the BC trace element 150 and CC trace element 160 to touch, a closed circuit is formed, whereby current passes across the one or more destruct features 125 thereby enabling the one or more destruct features 125. In a particular embodiment, destruct feature 125 may be a fuse, one time programmable logic device, or the like.

Figure 12:
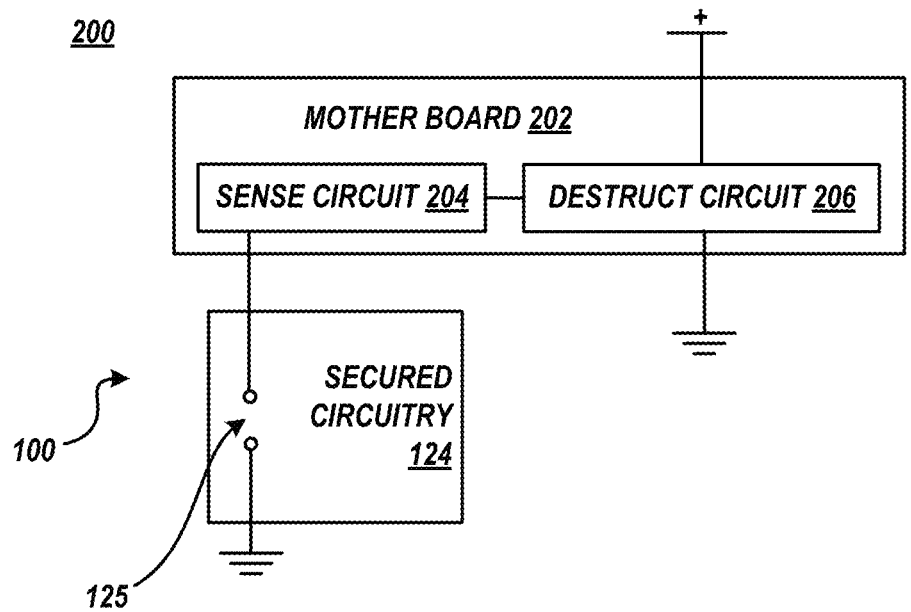
FIG. 12 illustrates of block diagram of a computer including a crypto card, according to various embodiments of the present invention.

FIG. 12 illustrates of block diagram of a computer 200 including a crypto card 100 installed on motherboard 202. In addition to computer components such as memory, processor, etc., motherboard 202 may also include a sense circuit 204 and a destruct circuit 206. The sense circuit 204 senses, monitors, or otherwise detects that destruct feature 125 has been enabled. Destruct circuit 206 is connected to a power supply, such as the power supply of computer 200. Upon sense circuit 204 determining destruct feature 125 has been enabled, destruct circuit 206 zeros area(s) of the computer 200 where sensitive data is stored (e.g., a hard drive, memory, etc.) and one or more functions of the computer 200 are permanently disabled. For example, the processor or memory may be disabled; an application program interface associated with crypto functions of secure crypto module 106 may be disabled, a bus connecting the processor and the crypto card 100 may be disabled, etc.

Figure 13:
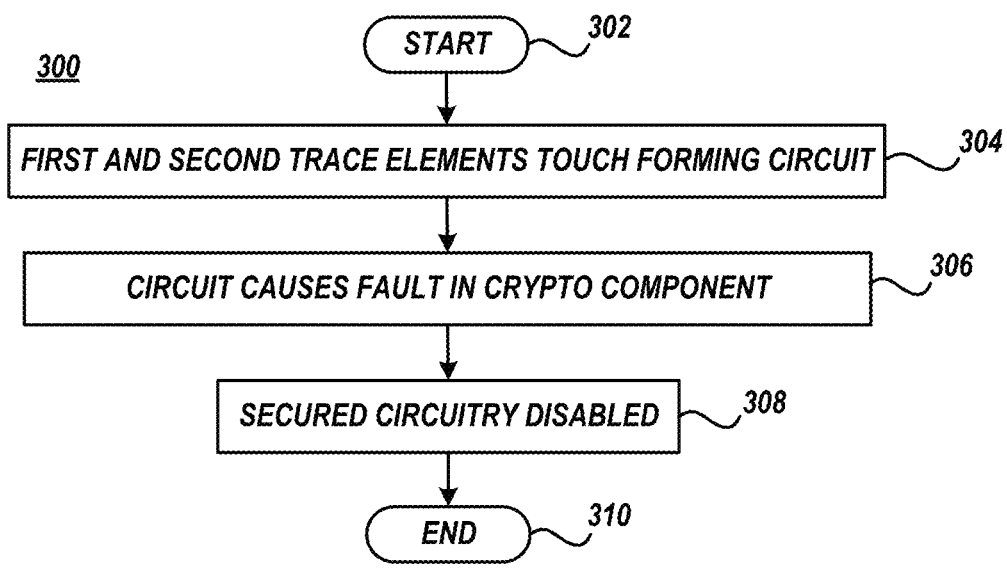
FIG. 13 and FIG. 14 illustrate exemplary methods of detecting and responding to an unauthorized attempt of physical access of a secure crypto module, according to various embodiments of the present invention.

FIG. 13 illustrates an exemplary method 300 of detecting and responding to an unauthorized attempt of physical access of a secure crypto module 106. Method 300 may be carried out by a computer, crypto card 100, or other electronic device, such as a cash machine, or the like. Method 300 may begin at block 302 and continues by a first trace element physically touching a second element forming a circuit (block 304). For example, BC trace element 150 and CC trace element 160 associated with one or more encapsulation layers within tamper sensing encapsulant 130 physically contact and completes a closed circuit between battery 126 and one or more crypto components 124. The physical contact of BC trace element 150 and CC trace element 160 is generally caused by thermal loading of secure crypto module 106 resulting in relative movement and touching of BC trace element 150 and CC trace element 160.

Method 300 may continue by the closed circuit causing a fault within crypto component 124 (block 306). For example, the completion of the closed circuit between battery 126 and one or more crypto components 124 enables one or more destruct features 125 within the one or more crypto components 124.

Method 300 may continue by disabling the crypto component 124 (block 308). For example, enabling of the destruct feature 125 results in area(s) of the one or more crypto components 124 where sensitive data is stored being zeroed and the one or more crypto components 124 becoming non functional. Method 300 ends at block 310.

Figure 14:
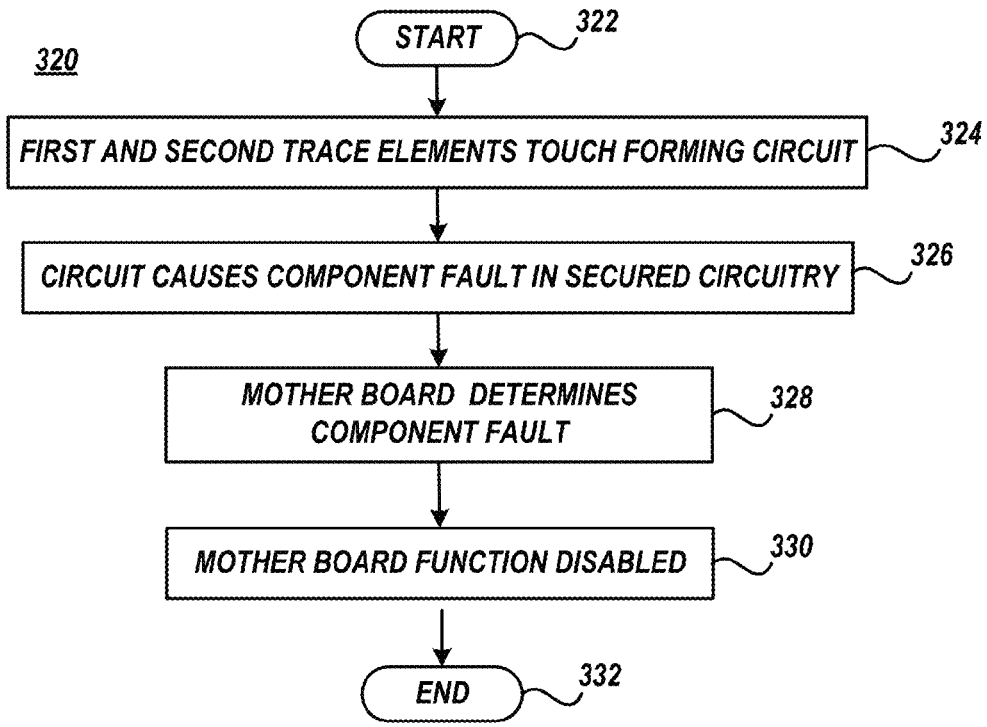

FIG. 14 illustrates an exemplary method 320 of detecting and responding to an unauthorized attempt of physical access of a secure crypto module 106. Method 320 may be carried out by a computer, crypto card 100, or other electronic device, such as a cash machine, or the like. Method 320 may begin at block 322 and continues by a first trace element physically touching a second element forming a circuit (block 324). For example, BC trace element 150 and CC trace element 160 associated with one or more encapsulation layers within tamper sensing encapsulant 130 physically contact and complete a closed circuit between battery 126 and one or more crypto components 124. The physical contact of BC trace element 150 and CC trace element 160 is generally caused by thermal loading of secure crypto module 106 resulting in relative movement and touching of BC trace element 150 and CC trace element 160.

Method 320 may continue by the closed circuit causing a fault within crypto component 124 (block 326). For example, the completion of the closed circuit between battery 126 and one or more crypto components 124 enables one or more destruct features 125 within the one or more crypto components 124.

Method 320 may continue by a mother board sensing the fault within the one or more crypto components 124 (block 328). For example, a processor upon mother board 202 determines the crypto component 124 is faulted. In another example, a sense circuit 204 within mother board 202 determines that one or more destruct features 125 within the one or more crypto components 124 have been enabled resulting in the fault of crypto component 124.

Method 320 may continue by the mother board disabling one or more of its functions (block 330). For example, destruct circuit 206 zeros area(s) of the mother board 202 where data associated with secure crypto module 106 is stored (e.g., mother board hard drive, mother board memory, etc.) and one or more functions of the mother board 202 are permanently disabled. For example, the processor upon the mother board 202 or memory upon mother board 202 may be disabled; an application program interface of the mother board 202 associated with crypto functions of secure crypto module 106 may be disabled, a bus of mother board 202 connecting the processor and the crypto card 100 may be disabled, etc. Method 320 ends at block 332.

Figure 15:
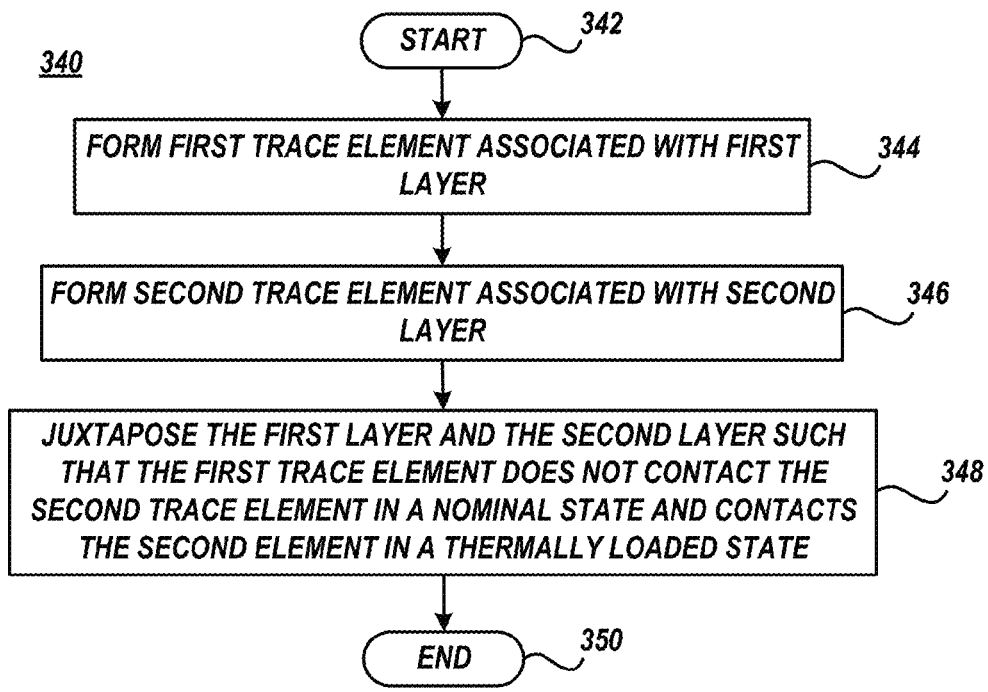
FIG. 15 illustrates an exemplary method of fabricating secure crypto module encapsulant layers, according to various embodiments of the present invention.

FIG. 15 illustrates an exemplary method 340 of fabricating secure crypto module 106 encapsulant layers. Method 340 may be utilized to form tamper sensing encapsulant 130 that may subsequently surround cryptographic module 110 between shield 120 and cryptographic module 110 within secure crypto module 106. Method 340 begins at block 342 and continues with forming a first trace element associated with a first encapsulant layer (block 344). For example, a BC trace element 150 or a CC trace element 160 may be formed within, partially within, upon, etc. the first encapsulant layer.

The first encapsulant layer may be a two way layer that respectively elongates and contracts in response to heating or cooling. The first encapsulant layer may be a one way layer shape actuation layer that either elongates in response to heating or contracts in response to cooling, or visa versa. Still the first encapsulant layer may be a stationary layer that maintains its shape in response to heating or cooling.

Method 340 may continue with forming a second trace element associated with a second encapsulant layer (block 346). For example, a BC trace element 150 or a CC trace element 160 may be formed within, partially within, upon, etc. the second encapsulant layer.

The second encapsulant layer may be a two way layer that respectively elongates and contracts in response to heating or cooling. The second encapsulant layer may be a one way shape actuation layer that either elongates in response to heating or contracts in response to cooling, or visa versa. In this embodiment, the second one way shape actuation layer responds oppositely if the first encapsulant layer is also a one way shape actuation layer. For example, if the first one way shape actuation layer elongates the second one way shape actuation layer contracts, or visa versa. Still the second encapsulant layer may be a stationary layer that maintains its shape in response to heating or cooling. If the second encapsulant layer is a stationary layer, the first encapsulant layer should not also be a stationary layer. In the possible configurations of the first layer and the second layer, this results in relative movement of the associated trace elements towards each other during thermal loading.

Method 340 may continue with juxtaposing or otherwise positioning the first layer and the second layer such that the first trace element and the second trace element do not physically touch in a normal operating state or temperature but do physically contact in a thermally loaded state or temperature (block 348). The juxtaposed first layer and second layer may subsequently be placed within shell 102 and electric terminals associated with BC trace element 150 or a CC trace element 160 may be connected to daughter card during crypto card 100 fabrication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of fabricating a crypto card comprising a printed circuit board, a tamper sensing encapsulant, and a crypto module, the method comprising:

forming the tamper sensing encapsulant by forming an electrically conductive first trace element associated with a first shape actuation layer, forming an electrically conductive second trace element associated with a second shape actuation layer, and positioning the first shape actuation layer against the second shape actuation layer such that the first trace element and the second trace element do not physically touch at a predetermined operational temperature and do physically touch when the first shape actuation layer and the second shape actuation layer are thermally loaded;

surrounding the crypto module with the tamper sensing encapsulant, the crypto module comprising a daughter card configured to interconnect with the printed circuit board, a battery, and a crypto component.

2. The method of claim 1, wherein the thermal load cools the first shape actuation layer and the second shape actuation layer.

3. The method of claim 1, wherein the thermal load heats the first shape actuation layer and the second shape actuation layer.

4. The method of claim 1, wherein upon the first trace element and the second trace element physically touching, a closed circuit is formed between the battery and the crypto component that enables a destruct feature within the crypto component to permanently disable the crypto component.

5. A method of detecting an unauthorized attempt of physical access of a secure crypto module of a crypto card, the crypto card further comprising a printed circuit board and a tamper sensing encapsulant, the method comprising:
   physically contacting a first trace element associated with a first shape actuation layer of the tamper sensing encapsulant that surrounds the secure crypto module with a second trace element associated with a second shape actuation layer of the tamper sensing encapsulant that surrounds the secure crypto module to form a circuit, as a result of thermal loading of the secure crypto module, wherein the first shape actuation layer is positioned against the second shape actuation layer such that the first trace element and the second trace element do not physically touch at a predetermined secure crypto module operational temperature and do physically touch when the first shape actuation layer and the second shape actuation layer are thermally loaded and wherein the crypto module comprises a daughter card configured to interconnect with the printed circuit board, a battery, and the secure crypto component.

6. The method of claim 5, further comprising:
   as a result of the first trace element physically touching the second trace element, generating a fault within a crypto component.

7. The method of claim 5, wherein the thermal load cools the first shape actuation layer and the second shape actuation layer.

8. The method of claim 5, wherein the thermal load heats the first shape actuation layer and the second shape actuation layer.

9. The method of claim 6, wherein causing the fault within the crypto component comprises:
   enabling one or more destruct features within the crypto component.

10. The method of claim 6, wherein causing the fault within the crypto component further comprises:
    zeroing a storage area of the crypto component.

11. The method of claim 6, wherein causing the fault within the crypto component further comprises:
    disabling the crypto component so that the crypto component becomes nonfunctional.

12. The method of claim 6, further comprising:
    sensing, with a motherboard, the fault of the crypto component.

13. The method of claim 12, further comprising:
    disabling, with the motherboard, one or more motherboard functions.

14. The method of claim 12, wherein disabling one or more motherboard functions comprises:
    zeroing a storage area of the motherboard.

15. The method of claim 12, wherein disabling one or more motherboard functions comprises:
    disabling the motherboard so that the motherboard becomes nonfunctional.

16. The method of claim 12, wherein disabling one or more motherboard functions comprises:
    disabling and application program interface (API) called by a processor of the mother board, the API associated with crypto functions of secure crypto module.

17. The method of claim 12, wherein disabling one or more motherboard functions comprises:
    disabling a bus of the motherboard, the bus connecting a processor of the motherboard and a crypto adapter card connected to the motherboard.

* * * * *